United States Patent
Barnes et al.

(10) Patent No.: US 9,330,429 B2
(45) Date of Patent: May 3, 2016

(54) SCALABLE WATERMARK INSERTION FOR FRAGMENTED MEDIA STREAM DELIVERY

(75) Inventors: Fritz Barnes, Alameda, CA (US); Kent Karlsson, Berkeley, CA (US); Cedric Fernandes, San Ramon, CA (US)

(73) Assignee: MobiTV, Inc., Emeryville, CA (US)

(*) Notice: Subject to any disclaimer, the term of this patent is extended or adjusted under 35 U.S.C. 154(b) by 217 days.

(21) Appl. No.: 13/399,377

(22) Filed: Feb. 17, 2012

(65) Prior Publication Data

US 2013/0219182 A1    Aug. 22, 2013

(51) Int. Cl.
| | |
|---|---|
| H04L 29/06 | (2006.01) |
| G06T 1/00 | (2006.01) |
| G06F 21/10 | (2013.01) |
| H04N 21/8358 | (2011.01) |
| H04N 19/467 | (2014.01) |

(52) U.S. Cl.
CPC ............. G06T 1/0085 (2013.01); G06F 21/10 (2013.01); H04N 21/8358 (2013.01); *G06F 2221/0733* (2013.01); *H04L 2209/608* (2013.01); *H04N 19/467* (2014.11)

(58) Field of Classification Search
CPC ........................................................ H04L 9/32
USPC ........................................................ 713/176
See application file for complete search history.

(56) References Cited

U.S. PATENT DOCUMENTS

| | | | |
|---|---|---|---|
| 7,398,395 B2 | 7/2008 | Epstein | |
| 7,783,888 B2 | 8/2010 | Green | |
| 2002/0054355 A1* | 5/2002 | Brunk | G06T 1/0071 358/3.28 |
| 2003/0009669 A1* | 1/2003 | White | H04N 1/32272 713/176 |
| 2003/0112974 A1* | 6/2003 | Levy | G06T 1/0071 380/210 |
| 2003/0190054 A1 | 10/2003 | Troyansky et al. | |
| 2004/0010692 A1* | 1/2004 | Watson | 713/176 |
| 2004/0260930 A1* | 12/2004 | Malik | G06F 21/10 713/176 |
| 2005/0025463 A1* | 2/2005 | Bloom et al. | 386/96 |
| 2007/0283448 A1* | 12/2007 | Green | G06T 1/0021 726/28 |
| 2008/0273861 A1 | 11/2008 | Yang et al. | |
| 2009/0019525 A1* | 1/2009 | Yu | H04L 63/1483 726/3 |
| 2009/0041237 A1* | 2/2009 | Takashima | G11B 20/00086 380/44 |
| 2009/0288170 A1* | 11/2009 | Osawa et al. | 726/26 |
| 2009/0319557 A1* | 12/2009 | Lipka | H04L 12/1881 |
| 2010/0303282 A1 | 12/2010 | Boyd et al. | |
| 2011/0080940 A1* | 4/2011 | Bocharov | H04N 21/4331 375/240.01 |

(Continued)

FOREIGN PATENT DOCUMENTS

| | | |
|---|---|---|
| DE | 112013000995 T5 | 12/2014 |
| GB | 2514306 | 11/2014 |
| WO | 2013122791 A1 | 8/2013 |

OTHER PUBLICATIONS

Collberg, Christian, Clark Thomborson, and Gregg M. Townsend. "Dynamic graph-based software watermarking." TR04-08, Department of Computer Science (2004).*

(Continued)

*Primary Examiner* — Harris C Wang
(74) *Attorney, Agent, or Firm* — Kwan & Olynick LLP (57) ABSTRACT

A media stream is delineated into multiple fragments. Different watermark variants of individual fragments are generated. Particular sequences of watermark variants are selected for particular clients and maintained in a user access database. Analyzing media streams allows determination of the sequences of watermark variants and identification of particular clients intended to receive the media streams. Fragments can continue to be cached efficiently and unique watermarks need not be generated for each individual client.

20 Claims, 5 Drawing Sheets

(56) References Cited

U.S. PATENT DOCUMENTS

| | | | | |
|---|---|---|---|---|
| 2011/0083037 | A1* | 4/2011 | Bocharov | H04N 21/23116 714/4.11 |
| 2011/0302618 | A1* | 12/2011 | Odlund | H04N 21/2183 725/109 |
| 2011/0314511 | A1* | 12/2011 | Hartung | H04H 20/31 725/151 |
| 2012/0308071 | A1 | 12/2012 | Ramsdell et al. | |
| 2013/0054972 | A1* | 2/2013 | Thorwirth | H04N 21/23439 713/176 |

OTHER PUBLICATIONS

"Int'l Application Serial No. PCT/US2013/024840, Search Report mailed Apr. 19, 2013", 2 pgs.

"Int'l Application Serial No. PCT/US2013/024840, Written Opinion mailed Apr. 19, 2013", 4 pgs.

Li, Z et al., "A scalable Watermarking Scheme for the Scalable Audio Coder", Institute for Infocomm Research; Department of Electrical and Computer Engineering, National University of Singapore, Retrieved from Internet <http://www.ee.columbia.edu/~qibin/papers/qibin2005_icc.pdf>, 6 pgs.

Meerwald, Peter et al., "Scalability evaluation of blind spread-spectrum image watermarking", Dept. of Computer Sciences, University of Salzburg, Austria, Retrieved from Internet <http://www.cosy.sbg.ac.at/~pmeerw/Watermarking/iwdw08/iwdw08_slides.pdf>, 18 pgs.

"Int'l Application Serial No. PCT/US2013/024840, Preliminary Report on Patentability mailed Aug. 28, 2014", 6 pgs.

* cited by examiner

SCALABLE WATERMARK INSERTION FOR FRAGMENTED MEDIA STREAM DELIVERY

TECHNICAL FIELD

The present disclosure relates to scalable watermark insertion for fragmented media stream delivery.

DESCRIPTION OF RELATED ART

Media streams typically involve encoding or re-encoding prior to transmission to clients. In many instances, media streams are encoded into a format such as MPEG-4 Part 10 or MPEG-4 Part 12. The encoding servers may have the capacity to perform real-time live encoding on numerous media streams simultaneously.

Digital watermarks provide a mechanism to detect that a media stream came from a particular source. Digital watermarks can also sometimes be used to identify a particular content consumer. To identify a particular content consumer, a particular digital watermark corresponding to the content consumer may be generated and embedded in a media stream delivered to that consumer. Identifying the particular watermark will allow identification of the particular consumer. This may be useful in identifying content consumers that are distributing the media stream in an unauthorized manner.

However, mechanisms for generating watermarks for media content are limited. Consequently, the techniques of the present invention provide mechanisms for scalable watermark insertion for fragmented media stream delivery.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragment servers. However, it should be noted that the techniques of the present invention may also apply to fragment server variations and media stream servers. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A media stream is delineated into multiple fragments. Different watermark variants of individual fragments are generated. Particular sequences of watermark variants are selected for particular clients and maintained in a user access database. Analyzing media streams allows determination of the sequences of watermark variants and identification of particular clients intended to receive the media streams. Fragments can continue to be cached efficiently and unique watermarks need not be generated for each individual client.

Example Embodiments

To allow for effective delivery of media streams, media streams are typically fragmented prior to delivery. Providing watermarks that can identify particular users or content consumers in such an architect is problematic in several respects. For example, unique watermarks have to be generated and associated with each different user in a system and included in numerous fragments. This can lead to potentially burdensome generation of robust watermark fragments. Furthermore, since each fragment becomes unique, providing unique watermarks in each of these fragments prevents caching and leads to inefficient usage of network and server resources.

Consequently, it is contemplated that not all fragments need to have embedded watermarks. According to various embodiments, watermarks may be included in only every nth fragment. Most fragments can still be labeled as cacheable. Content consumers would only need to ping a content server once every nth fragment, or when a fragment is not otherwise available in cache. This can significantly reduce network and server inefficiencies. However, providing a watermark only in every nth fragment makes the watermarking system less robust. To make the watermarking system more robust, the value of n would have to be reduced so that more fragments are watermarked. However, this reduces the efficiency of the system. Alternatively, if a content server can handle additional load and network conditions permit, the value of n can be increased so that fewer fragments are watermarked.

In particular embodiments, a certain percentage of a media stream is watermarked and a certain percentage of content consumers receive watermarked variants of the media stream.

According to various embodiments, a media stream provided in a cacheable format can still be watermarked. However, it cannot include traceable information that would identify the client that the content was delivered for, but can indicate the cache that received the data. This may be helpful in determining that a breach of content occurred in a particular location. Access logs may further narrow down the set of possible breaches to a particular set of users.

In many cases, a significant number of requests still have to be made to a content server. Furthermore, a user access database would still need to hold a number of different unique watermarks corresponding to the number of different unique users. This can be inefficient if watermarks require substantial storage space. The techniques of the present invention further contemplate providing watermark variants for various fragments. For example, a first fragment would have x different watermark variants such as watermark variant 1 fragment 1 (V1F1), watermark variant 2 fragment 1 (V2F1), watermark variant 3 fragment 1 (V3F1), watermark variant 4 fragment 1 (V4F1), watermark variant 5 fragment 1 (V5F1), etc. A second fragment would have x different watermark variants such as watermark variant 1 fragment 2 (V1F2), watermark variant 2 fragment 2 (V2F2), watermark variant 3 fragment 2 (V3F2), watermark variant 4 fragment 2 (V4F2), watermark variant 5 fragment 2 (V5F2), etc. Fragments 3 and 4 may not have any watermarks whatsoever.

In particular embodiments, every other fragment may have watermark variants. A user request for the index file or a continue command will be redirected and this redirect will then be randomly distributed over the x variants. The variants selected will be maintained in a user access database to associate sequences of variants with particular users. For example, user A may be provided with V1F1 and V3F2, user B may be provided with V3F1 and V4F2, and user C may be provided with V4F1 and V1F2. If a media stream is distributed in an unauthorized manner, extracting watermarks of the distributed media stream and determining the sequence of watermark variants would allow a system administrator to reference the user access database and determine who the media stream was transmitted to. For example, the watermark variant sequence may be determined to be V1F1 and V3F2 corresponding to user A.

The user access database may be a user identification database that is separately maintained, or may be a user access log that tracks what variants were distributed to which users. Using different sequences of watermark variants allows for scalability and efficiency, as fragments can be cached as there are a limited number of variants. For example, just several variants of a dozen fragments could provide sufficient unique sequences to identify millions of users. According to various embodiments, the number of unique sequences is determined by raising the number of variants to the power of the number of fragments. For example, 4 variants of 12 fragments would yield 4 raised to the power of 12 or over 16 million unique sequences.

Having only a limited number of variants of a limited number of fragments allows efficient caching and low overhead. According to various embodiments, watermark variant sequences do not even need to be unique in order to be useful, as they can help identify a reduced number of potential unauthorized content distributors.

According to various embodiments, digital watermarks can be embedded into fragments such as MPEG-4 fragments. MPEG-4 is an extensible container format that does not have a fixed structure for describing media types. Instead, MPEG-4 has an object hierarchy that allows custom structures to be defined for each format. The format description is stored in the sample description ('stsd') box for each stream. The sample description box may include information that may not be known until all data has been encoded. For example, the sample description box may include an average bit rate that is not known prior to encoding.

According to various embodiments, MPEG-4 files are fragmented so that a live stream can be intelligently encoded in a distributed architecture on dynamically scalable hardware, recorded, and played back in a close to live manner. MPEG-4 files can be created without having to wait until all content is written to prepare the movie headers. To allow for MPEG-4 fragmentation without out of band signaling, a box structure is provided to include synchronization information, end of file information, and chapter information. According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

Figure 1:
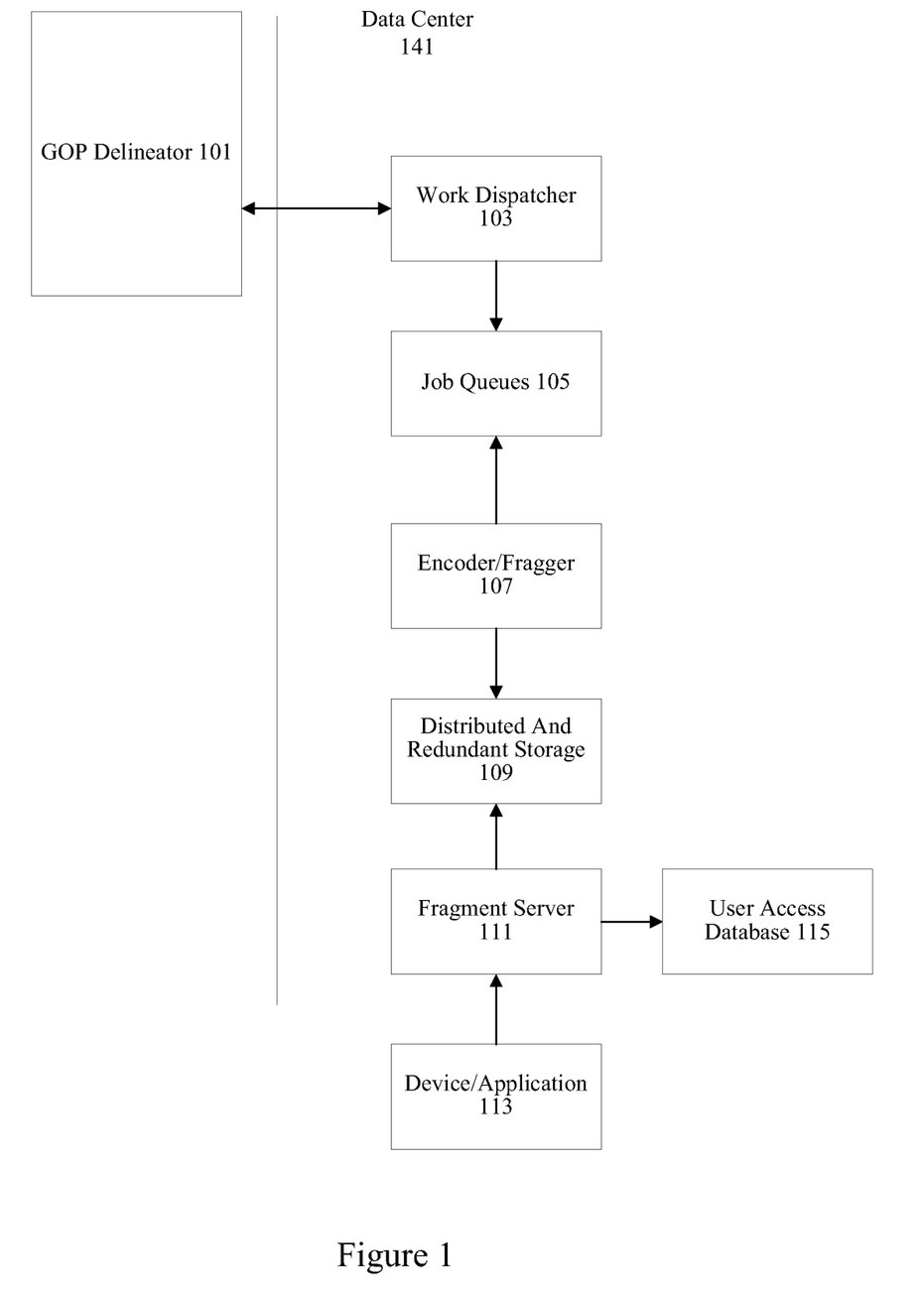
FIG. 1 illustrates one example of a distributed encoding system.

FIG. 1 illustrates one example of a system for watermarking. According to various embodiments, a media stream is received from a content provider source such as a satellite. In particular embodiments, the media stream is provided in an MPEG-2 format. The media stream is delineated into Groups of Pictures (GOPs) using a GOP delineator 101. The GOP is a group of pictures in coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or bi-directionally predictive coded frames contain different information indicating distinctions from a reference frame such as a key frame or another predictive frame.

After the media stream is delineated into GOPs, a work dispatcher 103 is notified that a GOP is available. According to various embodiments, the work dispatcher 103 determines if it is the one assigned to work on it as well as what should be done with the GOP. According to various embodiments, the work dispatcher may determine that the GOP should be encoded into 8 different variants. Furthermore, each of the 8 different variants may have 4 different watermark variants generated. In particular embodiments, the work dispatcher 103 creates a description of what needs to be done, assigns a weight or priority level to the job, and sends the job to job queues 105. According to various embodiments, job queues are first in first out (FIFO) queues that are empty most of the time. Encoders/fraggers 107 request jobs and obtain them from the job queues 105. According to various embodiments, jobs may be ordered in a job queue based on weight. In particular embodiments, encoders/fraggers 107 may select higher priority jobs first from the job queues.

In particular embodiments, different priority jobs are placed in different priority job queues. Multiple jobs may be taken from the higher priority job queues before a single job is taken from the lower priority job queues. According to various embodiments, highest priority jobs are processed before lower priority jobs. In particular embodiments, queues are assigned percentage of service values. A high priority queue may get serviced 40% of the time. A medium priority queue 30% of the time, and the remaining queues 20% and 10% of the time by the encoders/fraggers. According to various embodiments, hundreds or thousands of encoders/fraggers reside in a system. In particular embodiments, the same device performs both encoding and fragmentation, but it should be noted that separated devices can be used to perform these operations. According to various embodiments, additional encoder/fraggers can be dynamically brought online when resource usage reaches a particular threshold. Alternatively, encoder/fraggers can be taken offline when resources usage falls beneath a particular floor. According to various embodiments, encoder/fragger 107 is a virtual machine that may reside on one or more physical servers that may or may not have specialized encoding hardware. In particular embodiments, a cloud service determines how many of these virtual machines to use based on established thresholds.

According to various embodiments, a unique identifier is provided for each GOP and a log of each step is maintained. After the encoder/fragger 107 completes processing a job and outputs an encoded fragment, the encoded fragment is maintained in distributed and redundant storage 109. In one example, distributed and redundant storage 109 is a virtualized scale out network attached storage system. The distributed and redundant storage 109 allows a system to maintain numerous fragments on any number of virtualized storage devices.

According to various embodiments, fragments on distributed and redundant storage 109 are accessible by fragment server 111. According to various embodiments, encoder/fraggers can be used to embed watermark variants in particular fragments. In other examples, other entities such as the fragment server can embed watermark variants in particular fragments. The fragment server 111 provides the caching layer with fragments for clients. The design philosophy behind the client/server API minimizes round trips and reduces complexity as much as possible when it comes to delivery of the media data to a client device. The fragment server 111 provides live streams and/or DVR configurations.

In particular embodiments, a user access database 115 is used to maintain information about what watermark variants were provided to particular users. According to various embodiments, a user may be provided with watermark version 1 for a first fragment, watermark version 3 for a third fragment, watermark version 4 for a fifth fragment, watermark version 3 for a seventh fragment, etc. The user access database 115 may maintain the sequence 1, 3, 4, 3, corresponding to the particular user identifier. Extracting watermark information from a piece of media content would allow an administrator to identity the intended recipient.

Figure 2:
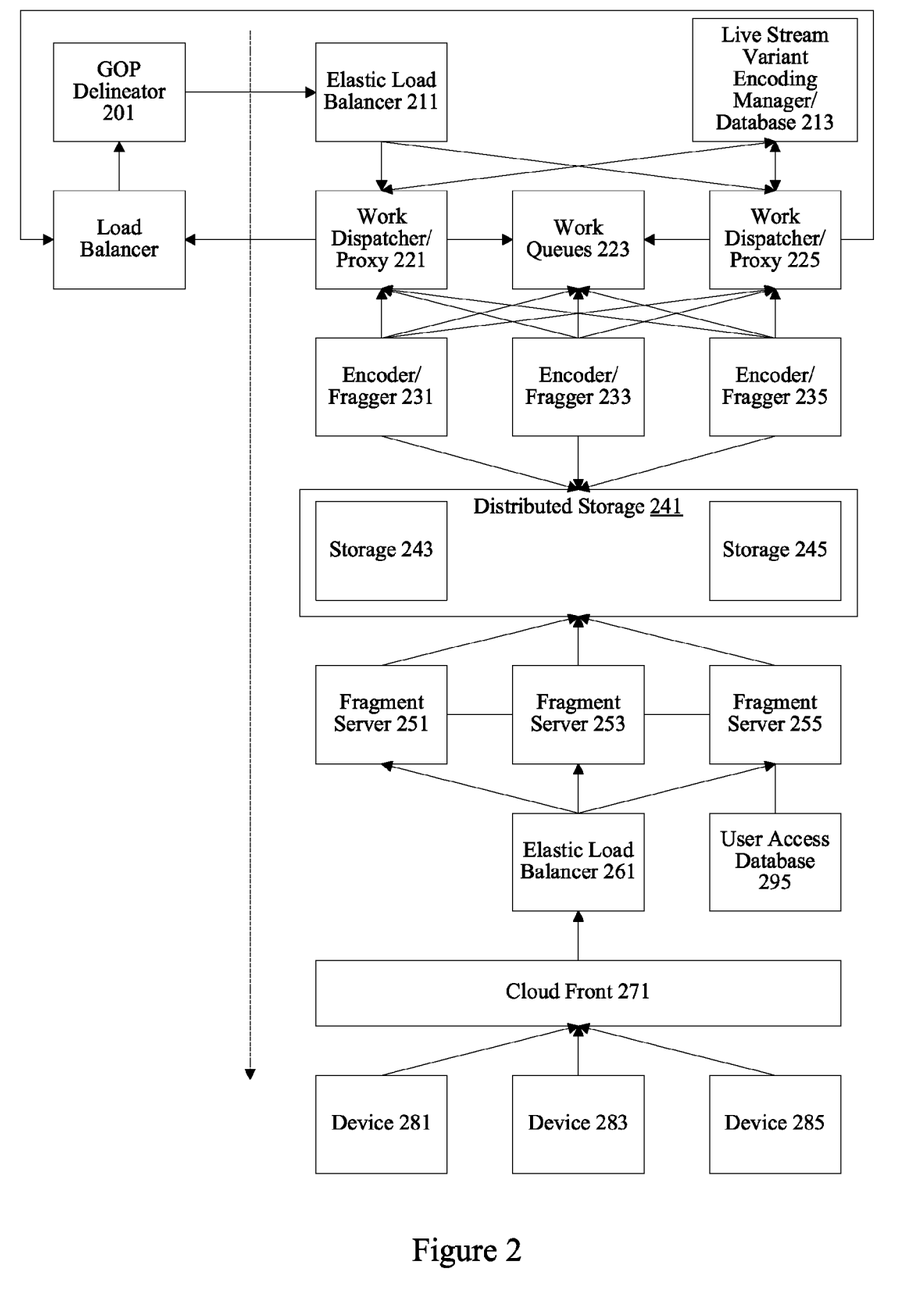
FIG. 2 illustrates one example of a mechanism for implementing distributed encoding redundancy with live stream variant monitoring.

FIG. 2 illustrates one example of a distributed, scalable encoding system that can be used to provide different watermark variants. According to various embodiments, a media stream is received from a content provider source such as a satellite. In particular embodiments, the media stream is provided in an MPEG-2 format. The media stream is delineated into Groups of Pictures (GOPs) using a GOP delineator 201. The GOP is a group of pictures in coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or hi-directionally predictive coded frames contain different information indicating distinctions from a reference frame such as a key frame or another predictive frame. According to various embodiments, multiple GOP delineators 201 are active simultaneously. If a GOP delineator fails, other GOP delineators are available and all GOP delineators can send out notifications.

After the media stream is delineated into GOPs, an elastic load balancer 211 is used to distribute work to work dispatchers 221 and 225. According to various embodiments, a live stream variant encoding manager 213 monitors live stream variant consumption. If particular variants are not being consumed, jobs for creating those variants are no longer performed. If particular not yet available variants are requested, then jobs creating those variants can be generated by the work dispatcher 225 at the request of the live stream variant encoding manager 213. If a work dispatcher fails right as it takes a notification, another notification occurs to a different work dispatcher. Two notifications for the same GOP will end up on two different machines. At each work dispatcher 221 and 225, there may also be a proxy. According to various embodiments, the GOP delineator 201 resides on a different data center than the work dispatchers 221 and 225. Using proxies at work dispatchers 221 and 225 allows for a single transfer of a media stream GOP between data centers.

According to various embodiments, the work dispatchers 221 and 225 determine characteristics of a particular job and what should be done with the GOP. According to various embodiments, the work dispatchers 221 and 225 may determine that the GOP should be encoded into 8 different variants. In particular embodiments, the work dispatchers 221 and 225 create descriptions of what needs to be done and send jobs to job queues 223. According to various embodiments, job queues 223 include an active job queue and a standby job queue. According to various embodiments, job queues are first in first out (FIFO) queues that are empty most of the time. Timeouts may be associated with each job in the queue. Encoders/fraggers 231, 233, and 235 request jobs and obtain them from the job queues 223. In particular embodiments, encoders/fraggers 231, 233, and 235 are identical and can be dynamically activated or deactivated. According to various embodiments, hundreds or thousands of encoders/fraggers reside in a system.

In particular embodiments, the same device performs both encoding and fragmentation, but it should be noted that separate devices can be used to perform these operations. According to various embodiments, additional encoder/fraggers can be dynamically brought online when resource usage reaches a particular threshold. Alternatively, encoder/fraggers can be taken offline, when resources usage falls beneath a particular floor. According to various embodiments, encoder/fragger 231, 233, and 235 is a virtual machine that may reside on one or more physical servers that may or may not have specialized encoding hardware. In particular embodiments, a cloud service determines how many of these virtual machines to use based on established thresholds.

According to various embodiments, encoders/fraggers 231, 233, and 235 are stateless. According to various embodiments, a unique identifier is provided for each GOP and a log of each step is maintained. If a particular encoder/fragger fails at any point in the process, another encoder/fragger can perform encoding and fragmentation operations. After the encoders/fraggers 231, 233, and 235 complete the jobs and generate encoded fragments, the encoded fragments are maintained in distributed and redundant storage 241. In one example, distributed and redundant storage 241 is a virtualized scale out network attached storage system. The distributed and redundant storage 241 includes nodes 243 and 245, allowing a system to maintain numerous fragments on any number of virtualized storage devices.

According to various embodiments, fragments on distributed and redundant storage 241 are accessible by fragment servers 251, 253, and 255. The fragment servers 251, 253, and 255 provide a caching layer with fragments for clients. The design philosophy behind the client/server API minimizes round trips and reduces complexity as much as possible when it comes to delivery of the media data to a client device. The fragment servers 251, 253, and 255 provide live streams and/or Diva configurations. According to various embodiments, fragment servers also operate without state. In particular embodiments, fragments servers operate using HTTP get requests. According to various embodiments, each process allows a flow to continue without having a centralized control point. An elastic load balancer 261 distributes fragment requests from a cloud front 271 provided to devices 281, 283, and 285. According to various embodiments, devices 281, 283, and 285 monitor and analyze media streams to determine what fragments should be cached. In some examples, devices 281, 283, and 285 cache any fragment that has been determined to be redundant to any fragment previously requested. Fragments can be compared using identifiers, hashes, etc.

According to various embodiments, a client device uses a media component that requests fragmented MPEG-4 files, allows trick-play, and manages bandwidth adaptation. In particular embodiments, bandwidth adaptation information, playlist information, and media data is included in a box structure generated by encoder/fraggers 231, 233, and 235. In particular embodiments, a device/application 281, 283, and/or 285 perform a transport control protocol 3-way handshake with fragment servers 251, 253, and/or 255 to initiate a connection to receive a media stream. According to various embodiments, instead of the device/application 281, 283, or 285 requesting bandwidth adaption information, playlist information, and media data in separate transactions from the fragment servers 251, 253, and/or 255 the bandwidth adaptation information, playlist information, and media data may be embedded in a box structure provided with the media stream fragments by the fragment server. In some examples, the box structure may be provided with first fragment.

In particular embodiments, a user access database 295 is used to maintain information about what watermark variants were provided to particular users. According to various embodiments, a user may be provided with watermark version 1 for a first fragment, watermark version 3 for a third fragment, watermark version 4 for a fifth fragment, watermark version 3 for a seventh fragment, etc. The user access database 295 may maintain the sequence 1, 3, 4, 3, corresponding to the particular user identifier. Extracting watermark information from a piece of media content would allow an administrator to identity the intended recipient.

Figure 3:
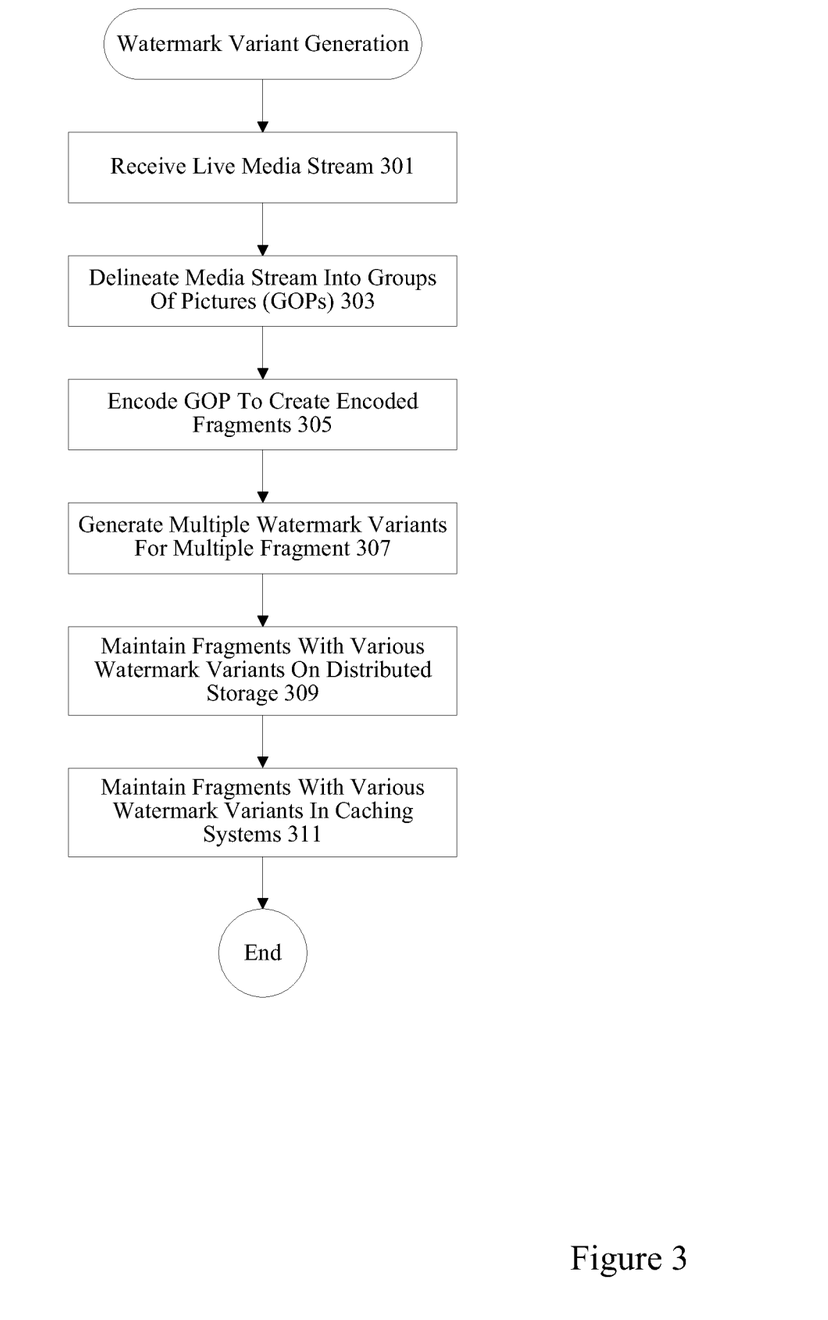
FIG. 3 illustrates a technique for requesting a media stream.

FIG. 3 illustrates one example of a technique for generating fragments with different watermark variants. At 301, a live media stream is received. According to various embodiments, the media stream is a live MPEG-2 media stream received from a satellite receiver. In particular embodiments, a live media stream refers to a media program received at a particular time that is designated for distribution at that particular time. For example, a program may be configured to run at 8 pm PST, and the live media stream is received at the satellite receiver at 8 pm PST. At 303, the media stream is delineated into GOPs. In particular embodiments, key frames are identified and used to begin groups of pictures. The GOPs may be optionally encrypted at this point before transmission at 305.

According to various embodiments, a work dispatcher may be used to determine that a GOP is available. According to various embodiments, a GOP delineator and the work dispatcher reside in different data centers and it is desirable to have a single GOP transfer instead of redundant GOP transfers. At 307, multiple watermark variants are generated for multiple fragments. In particular embodiments, multiple watermark variants are generated for a subset of the frames in a media stream. For example, five watermark variants may be provided for each odd numbered fragment in a media stream. In another example, varying numbers of watermark variants are provided for selected fragments. Fragments may be encoded into a format such as H.264. Encoded fragments are maintained on distributed storage at 309. A user can then continuously access the encoded fragments at a particular quality level through a fragment server that allows real-time or near real-time Internet Protocol (IP) distribution of the media stream fragments. According to various embodiments, fragments with various watermark variants may also be maintained in caching systems.

Figure 4:
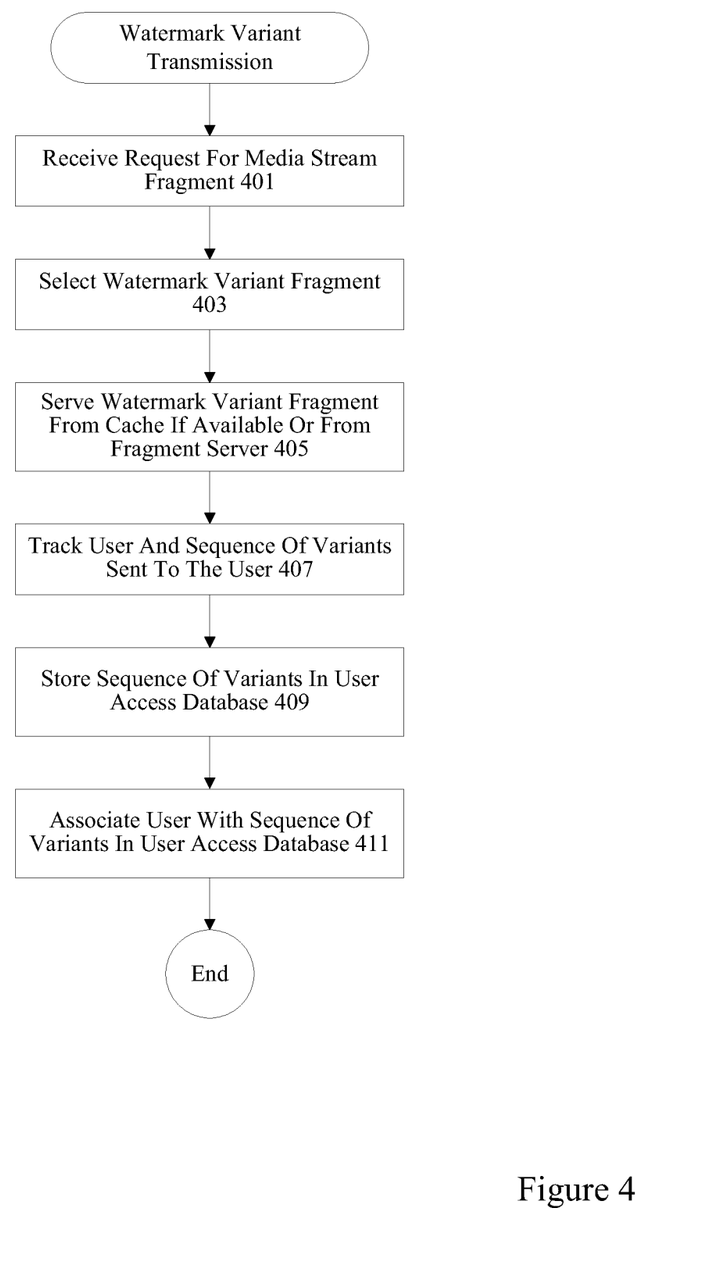
FIG. 4 illustrates a technique for enhanced fragment processing.

FIG. 4 illustrates one example of a technique for watermark variant transmission. According to various embodiments, a request is received for a media stream fragment at 401. According to various embodiments, the request is redirected to a selected watermark variant fragment 403. In particular embodiments, the selected watermark variant fragment may be randomly determined and/or predetermined. In some examples, a distribution function is used to balance allocation of various watermark variants so that individual content consumers are more likely to receive unique sequences.

According to various embodiments, the watermark variant fragment is served from cache if available or from a fragment server 405. The user and the sequence of variant sent to the user are tracked at 407. According to various embodiments, the sequence of variants is stored in a user access database at 409. The user is associated with a sequence of variants in a user access database at 411. According to various embodiments, the fragment server uses a REST API that is cache friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

According to various embodiments, the client includes an application logic component and a media rendering component. The application logic component presents the UI for the user and also communicates to the front-end server to get shows that are available for the user and to authenticate. As part of this process, the server returns URLs to media assets that are passed to the media rendering component.

In particular embodiments, the client relies on the fact that each fragment in a fragmented MPEG-4 file has a sequence number. Using this knowledge and a well-defined URL structure for communicating with the server, the client requests fragments individually as if it was reading separate files from the server simply by requesting URLs for files associated with increasing sequence numbers. In some embodiments, the client can request files corresponding to higher or lower bit rate streams depending on device and network resources.

Since each fragment contains the information needed to create the URL for the next file, no special playlist files are needed, and all actions (startup, channel change, seeking) can be performed with a single HTTP request. After each fragment is downloaded the client assesses among other things the size of the fragment and the time needed to download it in order to determine if downshifting is needed, or if there is enough bandwidth available to request a higher bitrate.

Because each request to the server looks like a request to a separate file, the response to requests can be cached in any HTTP Proxy, or be distributed over any HTTP based CDN.

Figure 5:
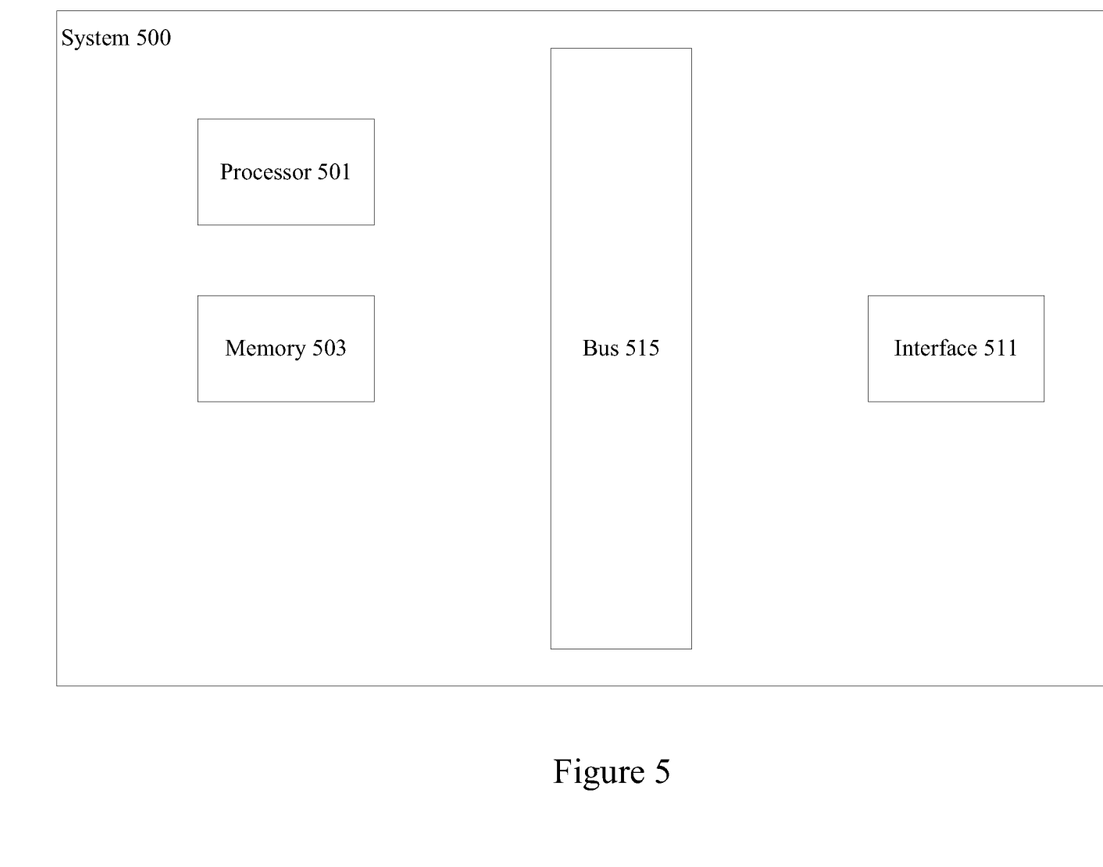
FIG. 5 illustrates one example of a system.

FIG. 5 illustrates one example of a computer system. According to particular embodiments, a system 500 suitable for implementing particular embodiments of the present invention includes a processor 501, a memory 503, an interface 511, and a bus 515 (e.g., a PCI bus or other interconnection fabric) and operates as a streaming server. When acting under the control of appropriate software or firmware, the processor 501 is responsible for modifying and transmitting live media data to a client. Various specially configured devices can also be used in place of a processor 501 or in addition to processor 501. The interface 511 is typically configured to send and receive data packets or data fragments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 500 is a fragment server that also includes a transceiver, streaming buffers, and a program guide database. The fragment server may also be associated with subscription management, logging and report generation, and monitoring capabilities. In particular embodiments, the fragment server includes functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server handles requests and responses for media content-related transactions while a separate streaming server provides the actual media streams.

Although a particular fragment server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method, comprising:
receiving a media stream;
fragmenting the media stream into a plurality of fragments including a first fragment and a second fragment, wherein each fragment in the plurality of fragments contains the information needed to create a URL corresponding to a next fragment;
generating a plurality of watermark variants of the plurality of fragments including a first watermark variant first fragment (V1F1) and a second watermark variant first fragment (V2F1) and a first watermark variant second fragment (V1F2) and a second watermark variant second fragment (V2F2); and
sending a first sequence of fragments to a first client and a second sequence of fragment to a second client, the first sequence of fragments including the first watermark variant first fragment (V1F1) and the second watermark variant second fragment (V2F2) and the second sequence of fragments including the second watermark variant first fragment (V2F1) and the first watermark variant second fragment (V1F2), wherein a particular sequence V1F1 and V2F2 identifies the first client and a particular sequence V2F1 and V1F2 identifies the second client, wherein the first client is configured to access V2F2 using information included within V1F1 and wherein the second client is configured to access V1F2 using information included within V2F1.

2. The method of claim 1, wherein a correspondence between the particular sequence V1F1 and V2F2 and the first client and a correspondence between the particular sequence V2F1 and V1F2 and the second client is maintained in a user access database.

3. The method of claim 1, wherein a particular sequence V1F1 and V1F2 is sent to a third client and identifies a third client.

4. The method of claim 1, wherein a particular sequence V2F1 and V2F2 is sent to a fourth client and identifies a fourth client.

5. The method of claim 1, wherein a third watermark variant first fragment (V3F1) is generated.

6. The method of claim 1, wherein the plurality of fragments includes a third fragment.

7. The method of claim 6, wherein the third fragment does not have any different watermark variants.

8. The method of claim 1, wherein the media stream is received at a fragment server.

9. The method of claim 1, wherein a particular sequence of watermark variant fragments operates as a user identifier.

10. The method of claim 1, wherein the particular sequence of watermark variant fragments is randomly generated and maintained in the user access database associated with a fragment server.

11. The method of claim 1, wherein the client is a client device.

12. The method of claim 1, wherein the client is a user.

13. A system, comprising:
an input interface configured to receive a media stream;
a processor configured to fragment the media stream into a plurality of fragments including a first fragment and a second fragment and generate a plurality of watermark variants of the plurality of fragments including a first watermark variant first fragment (V1F1) and a second watermark variant first fragment (V2F1) and a first watermark variant second fragment (V1F2) and a second watermark variant second fragment (V2F2), wherein each fragment in the plurality of fragments contains the information needed to create a URL corresponding to a next fragment; and
an output interface configured to send a first sequence of fragments to a first client and a second sequence of fragment to a second client, the first sequence of fragments including the first watermark variant first fragment (V1F1) and the second watermark variant second fragment (V2F2) and the second sequence of fragments including the second watermark variant first fragment (V2F1) and the first watermark variant second fragment (V1F2), wherein a particular sequence V1F1 and V2F2 identifies the first client and a particular sequence V2F1 and V1F2 identifies the second client, wherein the first client is configured to access V2F2 using information included within V1F1 and wherein the second client is configured to access V1F2 using information included within V2F1.

14. The system of claim 13, wherein a correspondence between the particular sequence V1F1 and V2F2 and the first client and a correspondence between the particular sequence V2F1 and V1F2 and the second client is maintained in a user access database.

15. The system of claim 13, wherein a particular sequence V1F1 and V1F2 is sent to a third client and identifies a third client.

16. The system of claim 13, wherein a particular sequence V2F1 and V2F2 is sent to a fourth client and identifies a fourth client.

17. The system of claim 13, wherein a third watermark variant first fragment (V3F1) is generated.

18. The system of claim 13, wherein the plurality of fragments includes a third fragment.

19. The system of claim 18, wherein the third fragment does not have any different watermark variants.

20. A non-transitory computer readable storage medium, comprising:
   computer code for receiving a media stream;
   computer code for fragmenting the media stream into a plurality of fragments including a first fragment and a second fragment, wherein each fragment in the plurality of fragments contains the information needed to create a URL corresponding to a next fragment;
   computer code for generating a plurality of watermark variants of the plurality of fragments including a first watermark variant first fragment (V1F1) and a second watermark variant first fragment (V2F1) and a first watermark variant second fragment (V1F2) and a second watermark variant second fragment (V2F2); and
   computer code for sending a first sequence of fragments to a first client and a second sequence of fragment to a second client, the first sequence of fragments including the first watermark variant first fragment (V1F1) and the second watermark variant second fragment (V2F2) and the second sequence of fragments including the second watermark variant first fragment (V2F1) and the first watermark variant second fragment (V1F2), wherein a particular sequence V1F1 and V2F2 identifies the first client and a particular sequence V2F1 and V1F2 identifies the second client, wherein the first client is configured to access V2F2 using information included within V1F1 and wherein the second client is configured to access V1F2 using information included within V2F1.

* * * * *